United States Patent [19]

Neal et al.

[11] 4,011,940
[45] Mar. 15, 1977

[54] HINGED STORAGE CONTAINER FOR TAPE CARTRIDGE WITH SELF-ALIGNING WALLS

[75] Inventors: Lloyd D. Neal, Redwood City; Allan R. Northrup, Cupertino, both of Calif.

[73] Assignee: Amaray International Corporation, San Jose, Calif.

[22] Filed: Dec. 12, 1975

[21] Appl. No.: 640,037

[52] U.S. Cl. .................. 206/1.5; 206/387; 220/306; 220/337; 220/339
[51] Int. Cl.² .............. B65D 43/16; B65D 51/04; B65D 85/67
[58] Field of Search .......... 206/387, 1.5; 229/44 R, 229/45, 33, 36; 220/306, 339, 337

[56] References Cited

UNITED STATES PATENTS

| | | | |
|---|---|---|---|
| 2,411,946 | 12/1946 | Vogel | 220/306 |
| 3,108,734 | 10/1963 | Hewko | 229/44 R |
| 3,306,520 | 2/1967 | Allard | 229/45 |
| 3,414,157 | 12/1968 | Wright | 220/339 |
| 3,583,556 | 6/1971 | Wagner | 220/339 |
| 3,876,071 | 4/1975 | Neal et al. | 206/387 |
| 3,907,103 | 9/1975 | Shaw | 220/306 |

Primary Examiner—William T. Dixson, Jr.
Attorney, Agent, or Firm—Boone, Schatzel, Hamrick & Knudsen

[57] ABSTRACT

A storage container for storing an article comprising a first wall having opposed front and back edges, opposed side edges, and a first inner surface, a second wall having opposed front and back edges, opposed side edges, and a second inner surface, a side wall extending inwardly from the second inner surface proximate the opposed side edges and the front edge, the side wall including a ramp which terminates in a notch, a back wall including hinges connected to the respective back edges such that the first inner surface is capable of being moved into a facing relationship relative to the second inner surface, the hinges being formed of a resilient material and serving to normally bias the first and second walls apart, the first, second, back and side walls serving to form an enclosure for storing an article when the front edges are aligned, a rigid rib having a ramp-engaging surface, the rib being connected to the first inner surface in alignment with the notch when the walls are formed into the enclosure, whereby when the inner surfaces are moved into a facing relationship the ramp-engaging surface engages the ramp, and whereby continued movement forces the ramp-engaging surface to slide relative to the ramp and into engagement with the notch such that the respective front edges are aligned, and a latch for securing the first, second, back and side walls into the enclosure when the front edges are aligned. In an alternative embodiment the rib is connected to the side wall and the ramp and notch are formed in a member extending from the first inner surface.

2 Claims, 10 Drawing Figures

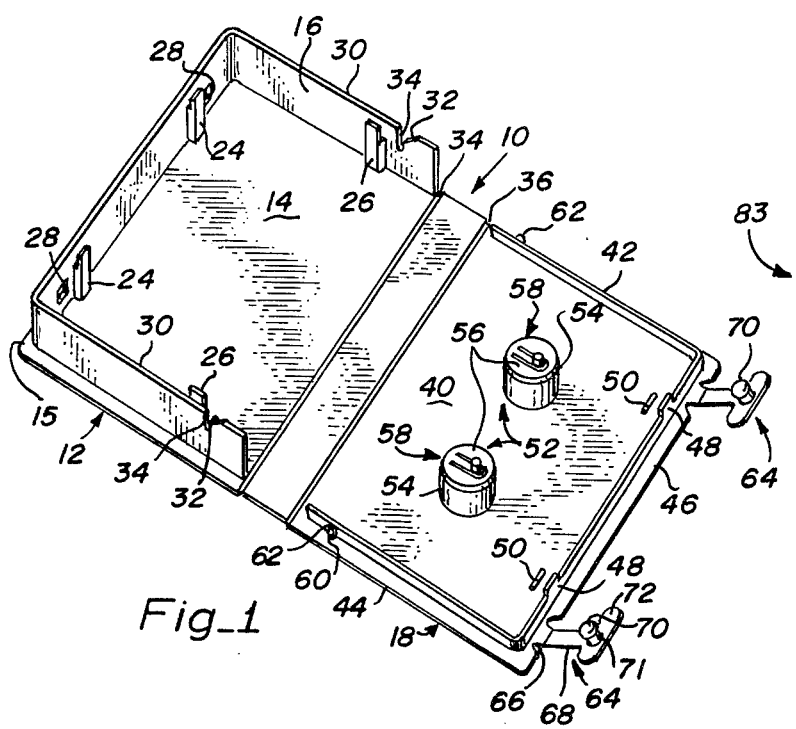
Fig_1
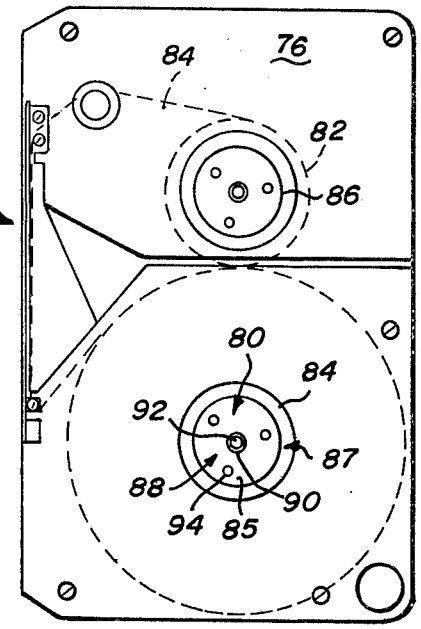
Fig_2
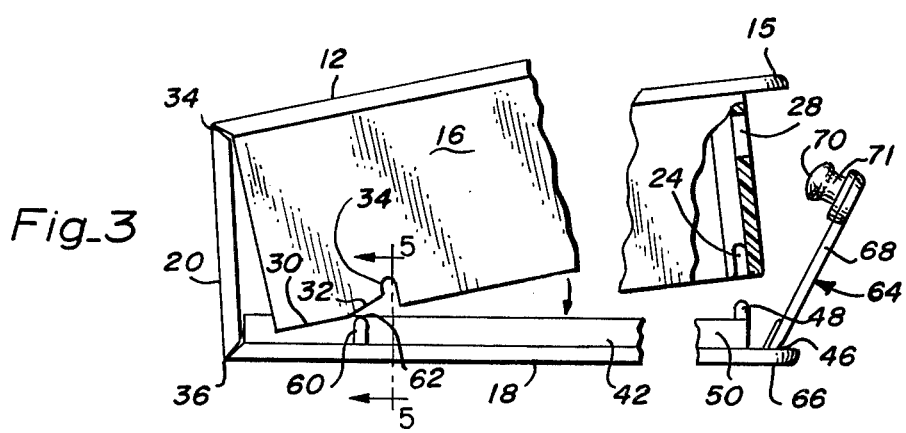
Fig_3
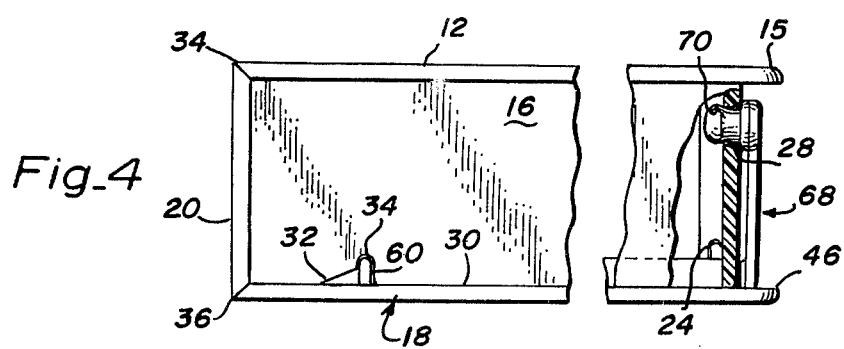
Fig_4

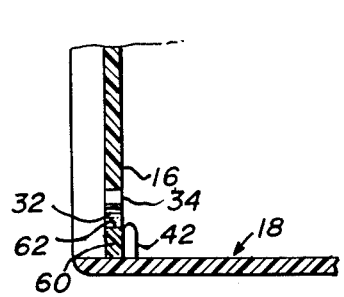
Fig_5
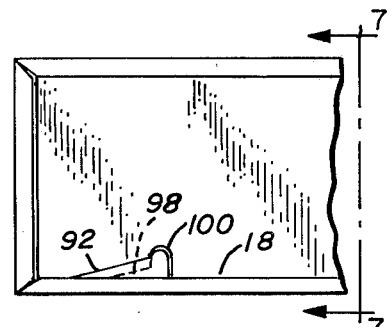
Fig_6
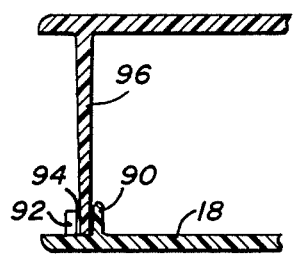
Fig_7
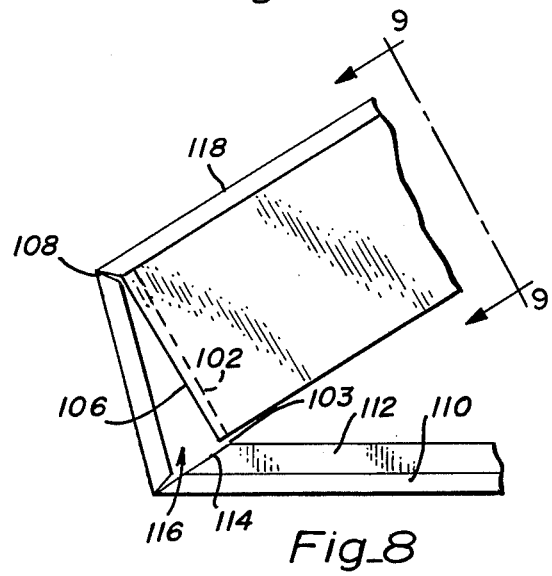
Fig_8
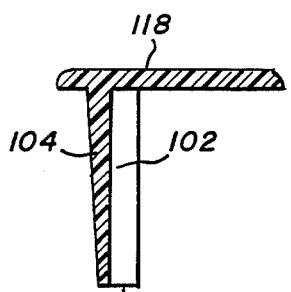
Fig_9
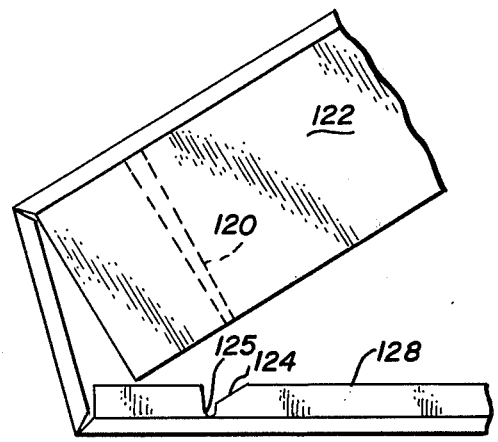
Fig_10

HINGED STORAGE CONTAINER FOR TAPE CARTRIDGE WITH SELF-ALIGNING WALLS

BACKGROUND OF THE INVENTION

1. Field of the Invention

The present invention relates generally to a storage container for storing magnetic tape and more particularly, to such a container having hinged walls and that includes a self-aligning mechanism which serves to align the front edges of the container and thus assure its complete closure when the side wall matingly engages the bottom wall.

2. Description of the Prior Art

Today tape cassettes or the like housing one or more reels of magnetic tape are used for storing information. For example, tape cassettes, cartridges, reels, etc., are used to house video, audio and computer tapes. To protect the cassette so as to minimize the risk of losing the stored information and to provide a means of storing or shipping the cassettes, it is quite common for the tape cassettes to be stored within storage containers.

A conventional storage container typically includes a top wall, a bottom wall, side walls, and a double-hinged back wall connected to the top and bottom walls which walls form a box-like enclosure when the side wall is latched to the bottom wall. Generally, such containers are molded as an integral assembly from a plastic material. As a result of molding, the hinges interconnecting the back wall to the top and to the bottom walls have an inherent resiliency that tends to bias the side wall away from the bottom wall when the container is closed. In addition, due to the combination of the double hinged structure and the bias, the back wall generally forms an angle other than normal relative to the bottom wall as it is moved forward during closure. In turn, the angular misalignment causes the front edges of the top and bottom walls to be misaligned. A disadvantage of such misalignment is that the walls do not mate. Consequently, tape cassettes stored therein are susceptible to falling out of the container and the interior of the container is not dust free. Should this occur, the information stored on the magnetic tape may be lost. An example of a storage container of the type described is found in U.S. Pat. No. 3,876,071.

SUMMARY OF THE PRESENT INVENTION

It is therefore an object of the present invention to provide a storage container having a self-aligning mechanism which serves to align the walls of the container during closure when the side wall matingly engages the bottom wall.

Another object of the present invention is to provide an improved storage container which includes a self-aligning wall feature and a self-latching feature which serve to prevent tape cassettes from inadvertently falling out of the container after the cover is closed.

Still another object of the present invention is to provide a storage container which is simply fabricated from a single material.

Briefly, the preferred embodiment of the present invention includes a first wall having opposed front and back edges, opposed side edges, and a first inner surface, a side wall extending inwardly from the first inner surface proximate the opposed side edges and the front edge, the side wall including a ramp declined toward the inner surface and terminating in a notch, a second wall having opposed front and back edges, opposed side edges, and a second inner surface, a back wall including hinges connected to the respective back edges such that said first inner surface is capable of being moved into a facing relationship relative to the second inner surface, the hinges being formed of a resilient material and serving to normally bias the first and second walls apart, the first, second, back and side walls serving to form an enclosure for storing an article when the front edges are aligned, a rigid rib having a ramp-engaging surface and being connected to the second inner surface in alignment with the notch when the walls are formed into the enclosure, whereby when the inner surfaces are moved into a facing relationship the ramp engages the ramp-engaging surface, and whereby continued movement forces the ramp-engaging surface to slide relative to the ramp and into engagement with the notch such that the respective front edges are aligned, and a latch for securing the first, second, back and side walls into the enclosure when the front edges are aligned.

An advantage of the storage container of the present invention that its top and bottom walls are automatically aligned upon closure in such a manner so as to provide a dust-free enclosure which prevents articles stored therein from falling out.

Another advantage of the present invention is that it is simply fabricated from a plastic material so as to facilitate manufacturing and preclude problems associated with intermixing metals and plastics.

These and other objects and advantages of the present invention will no doubt become apparent following a reading of the following detailed description of the preferred embodiments which are illustrated in the several figures of the drawing.

IN THE DRAWING

FIG. 1 is a perspective view of the storage container in accordance with the present invention;

FIG. 2 is a side elevational view of the type of tape cassette that may be stored in the storage container of FIG. 1;

FIGS. 3 and 4 are partial side elevational views illustrating the self-aligning feature of the storage container of FIG. 1;

FIG. 5 is a cross-section view taken through the lines 5—5 of FIG. 3;

FIG. 6 is a side elevation view of a second embodiment in accordance with the present invention;

FIG. 7 is a cross-section view take through the lines 7—7 of FIG. 6;

FIG. 8 is a side elevation view of yet another embodiment of the present invention;

FIG. 9 is a cross-section view taken through the lines 9—9 of FIG. 8; and

FIG. 10 is a side elevation view of still another embodiment in accordance with the present invention.

DETAILED DESCRIPTION OF THE PREFERRED EMBODIMENTS

The storage container for storing tape cassettes in accordance with the present invention is illustrated in perspective view in FIG. 1. As shown therein, the storage container comprises an integral hinged box-like enclosure generally designated by the numeral 10, which is shaped to receive a tape cassette therein. The enclosure 10 includes a top wall 12 having an inner surface 14 and a front edge 15, a side wall 16 depending inwardly from the inner surface 14, a bottom wall 18 and a rear wall 20.

The side wall 16 extends inwardly from the surface 14 proximate the front and side edges thereof a distance substantially equal to the dimension of the rear wall 20. A pair of keeper assemblies 24 having grooved ends are molded to the interior surface of the front portion of the side wall 16 intermediate the side portions thereof. The keeper assemblies 24 serve to receive protruding portions of the bottom wall 28 in a latching arrangement when the enclosure is closed as will be subsequently described. A pair of guides 26 having grooved ends are similarly molded to the interior surface of the portions of the side wall 16 near the side edges thereof and serve to strengthen the side walls. In addition, a pair of generally square apertures 28 are formed in the front portion of the side wall 16 intermediate the keeper assemblies and the respective side portions of the wall. Each of the distal ends 30 of the side portions of the side wall 16 include an inclined surface, or ramp 32, that terminates in a notch 34. In the preferred embodiment the ramp 32 forms an angle of about 15° relative to the end 30 and terminates proximate the midpoint of the rib 60 so as to allow an interference fit between the rib 60 and the ramp 32.

The rear wall 20 is substantially rectangular in plan view and includes hinges 34 and 36 (commonly referred to as "living" hinges) which are connected to the respective back edges of the walls 12 and 18 so as to enable the inner end 30 of the side wall 16 to be pivotally movable into a mating engagement with the bottom wall 18. The hinges 34 and 36 are each formed of a resilient material such as polypropylene and are thick enough to provide the strength required to withstand continual flexing due to closure of the box. However, hinges formed to meet this thickness requirement are not "thin" enough to allow the hinges to relax when the box is in the closed state. Consequently, it has been found that the hinges serve to normally bias the top and bottom walls apart when the box is closed. It is this problem that is solved by the present invention as will be subsequently described.

The wall 18 includes a planar inner surface 40 having a small rib 42 extending therefrom proximate its side edges 44 and front edge 46. The rib 42 is disposed laterally inwardly from the edges 44 and 46 a distance sufficient to enable the side wall 16 to lie slightly outside the rib 42 when the container is formed into the enclosure 10. Extending above the rib 42 are a pair of protruding portions 48 which are adapted to be received by the grooved ends of the keeper assemblies 24 and hence to latch the wall 16 to the bottom wall 18 when the enclosure is formed. Also, extending from the surface 40 inwardly of the respective protruding portions 48 and aligned parallel thereto are a pair of keeper engaging portions 50 which serve to frictionally capture the keeper assemblies 24 and thus enhance latching and a pair of cylindrical hub-engaging members 52. Each hub-engaging member 52 includes a cylindrical base portion 54 and a cap 56. The cap 56 carries a spring means 58 which coacts with the tape cassette to limit lateral and rotational movement of the associated reel, thereby preventing the tape from unwinding while the cassette is enclosed within the container. A more complete detailed description of the structure and operation of the hub-engaging members 52 is included in U.S. Pat. No. 3,876,071, "Storage Container for Tape Cassette with Self-Locking Spring to Prevent Tape Spillage" by Lloyd D. Neal and Allan R. Northrup.

In accordance with the present invention, a rib 60 is molded to the outside surface of each of the side portions of the rib 42 and to the inner surface 40. Each rib 60 extends a predetermined distance and includes an upper ramp-engaging surface 62 that has a generally convex shape and extends outwardly from the rib 42 a distance sufficient to enable the rib 60 to be in alignment with the side wall 16 so that the upper surface 62 fits within the notch 34 when the container is formed into the enclosure. In the preferred embodiment the rib 60 extends a distance greater than the width of the side wall to assure contact between the rib and the side wall.

A pair of latches 64 are connected by hinges 66 to the front edge of the bottom wall 18. The latches 64 include a strap, or leg, portion 68 connected to the hinge 66, in alignment with the apertures 28, a wall-engaging button portion 70, and an ear, or tab portion 72. The interior of the button portion 70 is hollow to allow the walls of the button portion to flex, rather than deform when the button portion is forced into an interference fit with the apertures 28. The button portion 70 is undercut as at 71 so that once the portion passes through the aperture 28 it is free to relax, thus preventing the button portion from being exposed to a continuous reaction force. The ear portion 72 serves to provide a lever arm-type connection to the button portion 70 and is of a dimension to enable a relatively small force to be sufficient to release the button portion 70 from the aperture 28 when unlatching the latch 64. In the preferred embodiment, its dimension is such as to require a force of about 70 percent of that ordinarily required.

Referring to FIG. 2 the tape cassette which is to be stored within the container in the preferred embodiment of the invention is illustrated. The tape cassette is a substantially rectangular plastic container having opposed first and second walls (only the wall 76 is shown). A storage reel 80 and a take-up reel 82 serve to contain a length of magnetic tape 84 therearound in a manner well known in the industry. Accordingly, as the tape 84 is wound from the storage reel 80 to the take-up reel 82 during play back or record operations, it passes through an opening in the cassette, generally designated by the numeral 83, where the information stored thereon is recorded, or read, by the appropriate electronics and magnetic transducer assembly (not shown). Although a tape cassette is illustrated, it should be recognized that articles such as sheets of paper, reels having magnetic tape wound therearound, cartridges or the like may also be stored in a container in accordance with the present invention.

Hubs 84 and 86 comprise the center portion of the reels 80 and 82, respectively. The hubs include a bottom wall 85 and a cylindrical side wall 87 that define a cylindrical recess, generally designated by the numeral 88, therewithin. The bottom wall 85 includes a central locating hole 90 for receiving a locating pin 92 which protrudes inwardly from the second wall of the tape cassette. The locating pin 92 serves to roughly position the reels 80 and 82 within the cassette. In addition, three drive holes 94 are disposed through the bottom wall 85 between the locating hole 90 and the side wall 87. The centers of the drive holes 94 lie on a circle having its center at the geometric center of the bottom wall such that the three drive holes are equally spaced apart and separated by 120°. Circular openings 96 are disposed through the first wall 76 so as to expose the cylindrical recesses of the respective hubs 84 and 86 so as to enable the hubs to be engaged and driven by an appropriate tape drive mechanism (not shown). In the preferred embodiment, the tape cassette is one manufactured by the Sony Corporation that holds three-fourths inch wide magnetic tape and which is designated by them as the U-Matic Cassette.

In the positioning the tape cassette in the container, the cassette is placed within the enclosure in an orientation such that the cylindrical recesses 88 of the hubs 84 and 86 are inserted over the respective hub-engaging members 52. In this manner the top surface of the cap 56 abuts the bottom wall 85 of the hub, and the cylindrical side walls 87 of the hub are either in contact or slightly out of contact with a corresponding surface of the base. With the tape cassette so positioned, a button portion of the spring means 56 may be in either the recessed position, which occurs if the button portion is not in alignment with one of the drive holes 94 of the bottom wall 84 of the hub, or the locking position, if alignment is achieved therebetween. After the enclosure is closed, if the button portion is in the recessed position and the container is jarred or vibrated slightly, the vibration causes the reel 80 to rotate and/or move laterally. As the reel 80 rotates, one of the drive holes 94 will quickly move into alignment with the button portion. At this time a spring portion of the spring means 56 which is continuously urging the button portion upward, causes the button to move into its locking position with the drive hole 94. Consequently, further lateral and rotational movement of the reel 80 is limited so as to prevent the tape from unwinding while the cassette is enclosed within the container.

The operation of the self-aligning wall feature of the present invention is illustrated with reference to FIGS. 3–5. Since there is no portion of the side wall adjacent the hinge 36 to serve as a locating surface, the position of the hinges 34 and 36 is not fixed and hence is subject to positional variations when the top wall 12 is moved into a facing relationship with the bottom wall 18. Such variations cause the front edges 15 and 46 to be misaligned which in turn prevents the container from latching.

In accordance with the present invention as the top wall 12 is forced downward by a person closing the container, the ramp-engaging surfaces 62 of the ribs 60 contact the distal ends 30 of the side walls 16 on or near the ramp 32 due to the alignment of the ribs 62 and the side walls 16 (see FIGS. 3 and 5). Continued downward force causes each ramp 32 to slide relative to the ramp-engaging surfaces 62. Further movement also causes the protruding portions 48 to engage the grooved ends of the keeper assemblies 24. When the notch 34 is engaged by the rib 60 the front edges 15 and 46 are aligned (see FIG. 4) and the side wall 16 is latched to the bottom wall 18 by the engagement of the protruding portions 48 and the keepers 24. To enhance latching, the keeper engaging portions 50 and opposed portion of the rib 42 frictionally engage and hold the keepers 24. Accordingly, the container is formed into a dust-free enclosure by the walls 12, 16, 18 and 20.

Another feature of the present invention is the provision of an alternative latching mechanism. After the enclosure is formed as previously described, the straps 68 are pivoted about the hinges 66 and the button portions 70 are forced through the apertures 28. Because of the undercut 71, the button portion 70 is free to relax once it passes through the aperture 28. In addition, since the interior of the button portion 70 is hollow, the walls of the button portion flex rather than deform when it is forced through the aperture in a manner which enhances the life expectancy of the latches 64. To open the container, the ear portions 72 of the latches 64 are pushed away from the front wall, thus releasing the button portion 70 from the side wall 16. Then the top wall is urged away from the bottom wall until the keepers 24 are released from the protruding portions 48, hence allowing the container to open.

Referring now to FIGS. 6 and 7, an alternative embodiment of the present invention is illustrated. As shown, the bottom wall 18 includes an inner rib 90, an outer rib 92 and a rib 94 molded to the rib 90 and extending between the rib 90 and the rib 92. A side wall 96, constructed similarly to the side wall previously described, includes a ramp 98 and a notch 100 (shown in dashed lines in FIG. 6). In this embodiment when the container is closed, the outer rib 92 serves to trap the side wall 96 and to prevent it from flexing outward during closure, thereby insuring alignment of the associated front edges (not shown) of the top and bottom walls.

Still another embodiment of the present invention is illustrated in FIGS. 8 and 9. The fundamental difference between this embodiment and the embodiment illustrated in FIGS. 3 and 4 is that a rib 102 having a ramp-engaging surface 102 is molded to the inside surface of the side wall 104 at the end 106 closest the hinge 108. The rib 102 serves to strengthen the side wall 104 and to prevent its flexing during closure. In addition, the bottom wall 110 includes a rib 112, therearound having a ramp 114 and terminating a distance from the hinge 108 so as to form a notch 116. In this embodiment as the top wall 118 is forced downward, the rib 102 engages the ramp 114. Continued movement of the wall 118 forces the ramp-engaging surface 103 to slide along the ramp 114 and into engagement with the notch 116, thus aligning the respective front edges (not shown) of the top and bottom walls. It should be noted that since the rib 102 protrudes towards the central portion of the enclosure it is not visible from the outside, thus enhancing the aesthetic quality of the container.

Referring now to FIG. 10, still another embodiment is illustrated. The fundamental difference between this embodiment and the one illustrated in FIGS. 8 and 9 is that the rib 120 is molded to the interior of the side wall 122 intermediate its ends and that the ramp 124 and notch 125 portions of the rib 128 are formed intermediate the ends of the rib 128. In operation the rib 120 engages the ramp 124 as the container is closed. Continued pressure forces the rib 120 down the ramp 124 and into engagement with the notch 126.

In the preferred embodiment of the present invention, the storage container is formed as an integral unit with a plastic injection molding process. The only additional manufacturing step required is to place the cap assembly onto the hub-engaging member. The storage container is formed from polypropylene, although any plastic, including other members of the olefin family may be used. The use of polypropylene allows the hinges to be molded integrally with the top, bottom and rear walls.

Alternatively, the rib may be free-standing and not affixed to the side wall 16 or the rib 42 and, in addition, may be formed from a different material having a coefficient of friction which allows it to be relatively slideable on the ramp.

In the embodiments shown, the storage container is constructed for receiving a tape cassette having two reels. It will be clear, however, in accordance with the above disclosure that a container may be made for receiving a cartridge having a single reel. In that case, the bottom wall includes only a single hub-engaging member.

The terms "front" and "rear" and words of similar import as used herein are intended to apply only to the position of the parts as illustrated in the drawing, since it is well known that containers of the general type illustrated may be oriented in many positions.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A storage container for storing an article comprising:
    a first wall having opposed front and back edges, opposed side edges, and a first inner surface;
    a second wall having opposed front and back edges, opposed side edges, and a second inner surface;
    a pair of opposed side walls extending inwardly from said second inner surface proximate said respective opposed side edges, each side wall including an elongated ramp declined toward said second inner surface and terminating in a notch;
    a front wall extending inwardly from said second inner surface proximate said front edge and connecting said side walls;
    a back wall including first and second hinges connected to said respective back edges such that said first inner surface is capable of being moved into a facing relationship relative to said second inner surface, said first and second hinges being formed of a resilient material and serving to normally bias said first and second walls apart, said first, second, back, front and side walls serving to form an enclosure for storing an article when said front edges are aligned;
    a first rib extending inwardly from said first inner surface a distance from said side edges and said front edge that is slightly greater than that corresponding to the location of said side and front walls such that said first rib is enclosed by said side and front walls when said walls are formed into said enclosure;
    a pair of rigid second ribs, each being molded to a respective outer surface of said first rib in alignment with said notches when said walls are formed into said enclosure, and having a ramp-engaging surface whereby when said inner surfaces are moved into a facing relationship said ramp-engaging surfaces engage said ramps, and whereby continued movement forces said ramp-engaging surfaces to slide relative to said ramps and into engagement with said respective notches, said movement serving to correspondingly move said second wall to a location such that said respective front edges of said first and second walls are aligned;
    a pair of third ribs each extending inwardly from said first inner surface at locations outside and parallel to respective ones of said first ribs, said first and third ribs serving to capture said side walls when said walls are formed into said enclosure; and
    latching means for securing said first, second, back, front and side walls into said enclosure when said front edges are aligned.

2. A storage container as recited in claim 1 wherein said second ribs are further molded to said first inner surface intermediate said front and back edges.

* * * * *